United States Patent [19]

Koyama et al.

[11] Patent Number: 5,596,355
[45] Date of Patent: Jan. 21, 1997

[54] COLOR INK JET RECORDING APPARATUS CAPABLE OF HIGH-QUALITY PRINTING OF BLACK PORTIONS

[75] Inventors: Toshio Koyama; Masami Furuya; Toyohiro Takahashi, all of Kanagawa, Japan

[73] Assignee: Fuji Xerox Co., Ltd., Tokyo, Japan

[21] Appl. No.: 68,177

[22] Filed: May 28, 1993

[30] Foreign Application Priority Data

Jun. 1, 1992 [JP] Japan .................... 4-140587

[51] Int. Cl.$^6$ .................. B41J 2/21; G06F 3/12; G06K 15/00; H04N 1/46
[52] U.S. Cl. .............. 347/43; 347/15; 358/502; 358/529; 395/109
[58] Field of Search .................. 347/15, 43, 100, 347/14, 19; 358/502, 504, 518, 529, 523; 395/107–109; B41J 2/21; G06F 3/12; G06K 15/00; H04N 1/40, 1/46

[56] References Cited

U.S. PATENT DOCUMENTS 4,682,216  7/1987  Sasaki et al. ............... 358/529
5,168,552 12/1992  Vaughn et al. .............. 395/109
5,315,382  5/1994  Tanioka ..................... 358/523
5,428,377  6/1995  Stoffel et al. ............... 347/15

FOREIGN PATENT DOCUMENTS 64-75252A  3/1989  Japan .
4-147866   5/1992  Japan ..................... 347/43

*Primary Examiner*—Benjamin R. Fuller
*Assistant Examiner*—Craig A. Hallacher
*Attorney, Agent, or Firm*—Finnegan, Henderson, Farabow, Garrett & Dunner, L.L.P.

[57] ABSTRACT

A dot judgment circuit judges whether there exists color information in dot-pattern-developed image data of pixels around a black pixel under attention. When not finding the existence of color information, the dot judgment circuit selects a head driver for driving a recording head for jetting a slow drying black pixel. When finding the existence of color information, the dot judgment circuit selects a head driver for a recording head for jetting a quick drying black ink or head drivers for recording heads for jetting quick drying Y, M and C inks.

7 Claims, 4 Drawing Sheets

COLOR INK JET RECORDING APPARATUS
CAPABLE OF HIGH-QUALITY PRINTING
OF BLACK PORTIONS

BACKGROUND OF THE INVENTION

The present invention relates to a color ink jet recording apparatus specifically of the type which can provide high-quality printing of black portions.

Among conventional color ink jet recording apparatuses is one disclosed in Japanese Patent Application Unexamined Publication No. Sho. 64-75252. In this color ink jet recording apparatus, printing data is subjected to discrimination between low density level data and high density level data, and two sets of recording heads are provided which respectively use low-density inks Y1 (yellow), M1 (magenta), C1 (cyan)and high-density inks Y2, M2, C2 and K (black). Printing is made using the single black ink in black portions of character and symbol areas where high resolution is required, and using two sets of inks (excluding the black ink) of different densities in dark and light image areas such as photograph areas where high gradation performance is required.

However, since the recording heads are used for the respective inks of high and low densities, the above conventional color ink jet recording apparatus is not only expensive but also complex and bulky.

Further, in the conventional apparatus, a wide black portion in a dark and light image area is printed with the inks for dark and light images. In general, quick drying inks are used for dark and light images, and they cannot provide high-quality printing of black images because of their low printing densities. Therefore, in the conventional apparatus, a wide black portion in a dark and light image area cannot be printed with sufficient image quality. On the other hand, if a black portion in or adjacent to a dark and light image area is printed using a slow drying ink, ink running may occur to deteriorate the image quality.

SUMMARY OF THE INVENTION

An object of the invention is to provide a color ink jet recording apparatus which is free from ink running in dark and light image areas, and can produce a high-quality color image even in its black portions.

According to the invention, a color ink jet recording apparatus comprises:

first ink jetting means operative to jet a slow drying or high-density ink;

second ink jetting means operative to jet at least one quick drying or low-density ink;

means for judging existence of color information in pixels adjacent to a black pixel under attention, and for generating a judgment signal indicating a result of the judgment; and means for selectively driving the first ink jetting means and the second ink jetting means based on the judgment signal.

DESCRIPTION OF THE PREFERRED EMBODIMENTS

Embodiments of the present invention are hereinafter described with reference to the accompanying drawings.

Figure 1:
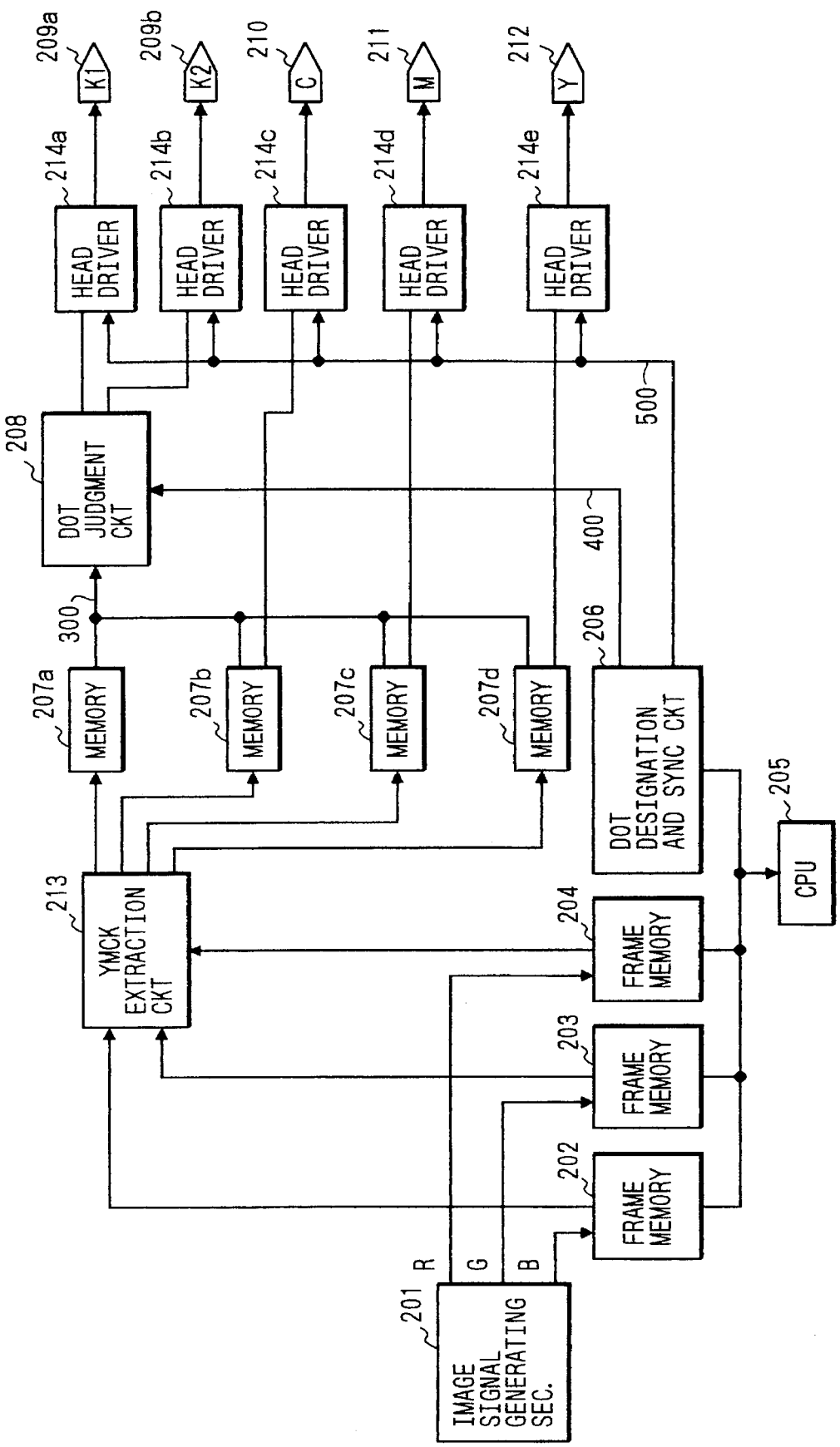
FIG. 1 is a block diagram showing a recording head drive circuit of a color ink jet recording apparatus according to an embodiment of the invention.
Figure 2:
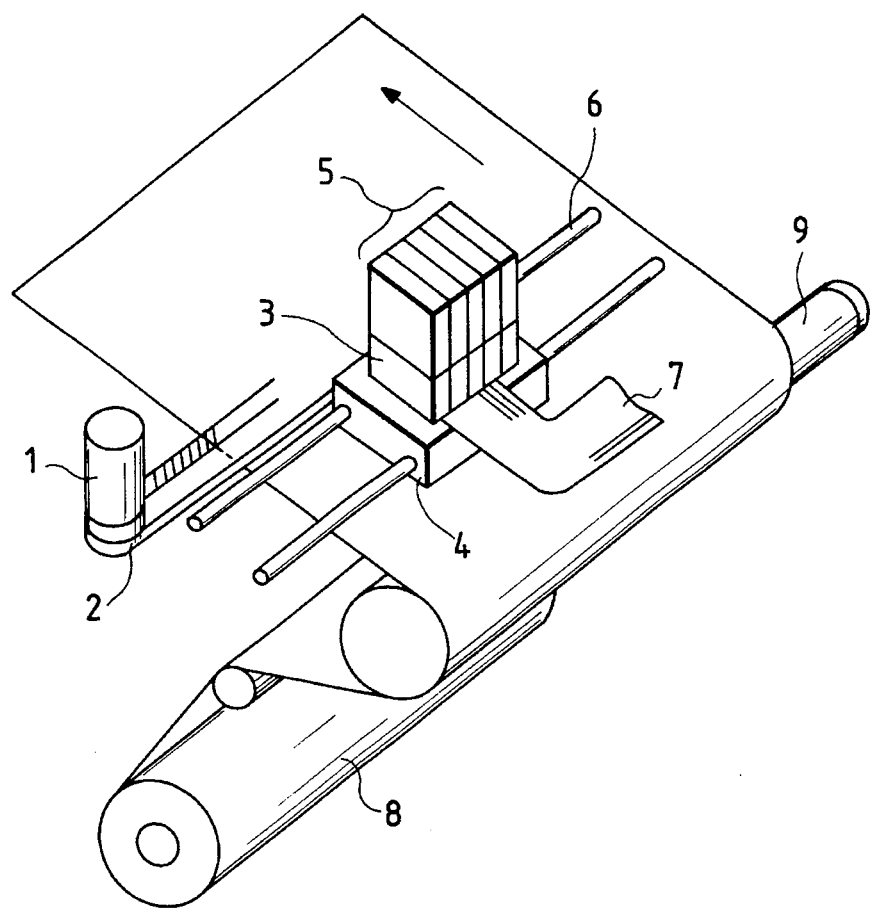
FIG. 2 is a perspective view showing a general mechanical structure of the color ink jet image recording apparatus.

FIG. 1 is a block diagram showing a recording head drive circuit of a color ink jet recording apparatus according to an embodiment of the invention, and FIG. 2 is a perspective view showing a general mechanical structure of the color ink jet recording apparatus.

Referring to FIG. 2, the color ink jet recording apparatus comprises recording heads 3 for jetting ink drops, ink tanks 5 for supplying inks to the respective recording heads 3, a head carriage 4 to which the recording heads 3 are fixed, a driving motor 1 for driving the head carriage 4 to effect scanning by the recording heads 3, a timing belt 2 and guides 6 for controlling the movement of the head carriage 4, a power/signal supply cable 7 for supplying the recording heads 3 with head drive signals generated by binarizing (developing into dot patterns) color image data, a sheet feeding motor 9 moving a recording sheet 8 on which inks jetted from the recording heads 3 are to be fixed, and other parts.

With the above structure, while the head carriage 4 is moved from the left to right in FIG. 2 by the driving motor 1 to effect scanning by the recording heads 3 that are fixed to the head carriage 4, ink drops are jetted from the recording heads 3 to perform the recording. Drivers of the recording heads 3 are provided with the dot data generated by binarizing (developing into dot patterns) the color image data. Upon completion of one-line recording, the recording sheet 8 is fed by one line by the sheet feeding motor 9, during which the recording heads 3 are returned to the left-side end in FIG. 2. Then, the next line is subjected to the recording.

In this embodiment, to attain high image quality, quick drying inks of K, C, M and Y and a slow drying ink of K are provided in the respective ink tanks 5, and selection is made between two kinds of K inks in accordance with whether a black area is separated from color areas or adjacent thereto. The quick drying ink means an ink which, for instance on plain paper for copiers, exhibits surface tension of less than 40 dyne/cm and apparent drying speed of less than 5 seconds, preferably less than 1 second when a 1-cm$^2$ patch is printed. The slow drying ink means an ink which, on plain paper for copiers, exhibits surface tension of more than 35 dyne/cm, preferably 40 dyne/cm and apparent drying speed of more than 5 seconds when a 1-$^2$ patch is printed. With the use of the above kinds of inks, by examining pixel data around a black pixel under attention, the slow drying K ink capable of providing high-quality black images is used for a black area separated from color areas, and the quick drying K ink that is free from ink running with respect to the quick drying inks of C, M and Y for color images is used for a black portion adjacent to a color area.

Referring to FIG. 1, the drive method of the recording heads 3 is described below. In FIG. 1, an image signal generating section 201 is connected to, for instance, a computer, and generates and processes digital color image data of B (blue), G (green) and R (red). Frame memories 202–204 store the respective color image data of B, G and R sent from the image signal generating section 201. A dot designation and sync circuit 206 designates printing dots and takes printing timing. A YMCK extraction circuit 213 generates binarized (dot-pattern-developed) Y, M, C and K data from the B, G and R data. Memories 207a–207d store the dot pattern data of the respective colors sent from the YMCK extraction circuit 213. A dot judgment circuit 208 judges whether there exists a pixel having color information (Y, M and C) around the black pixel (dot) under attention, and divides the binary black data from the memory 207a into black data for the slow drying ink and black data for the quick drying ink based on the judgment result. Head drivers 214a–214e drive respective recording heads 209a, 209b and 210–212. The recording head 209a jets out drops of the slow drying K ink, and the recording heads 209b and 210–212 jet out drops of the quick drying K, C, M and Y inks, respectively (see FIG. 2).

Figure 3:
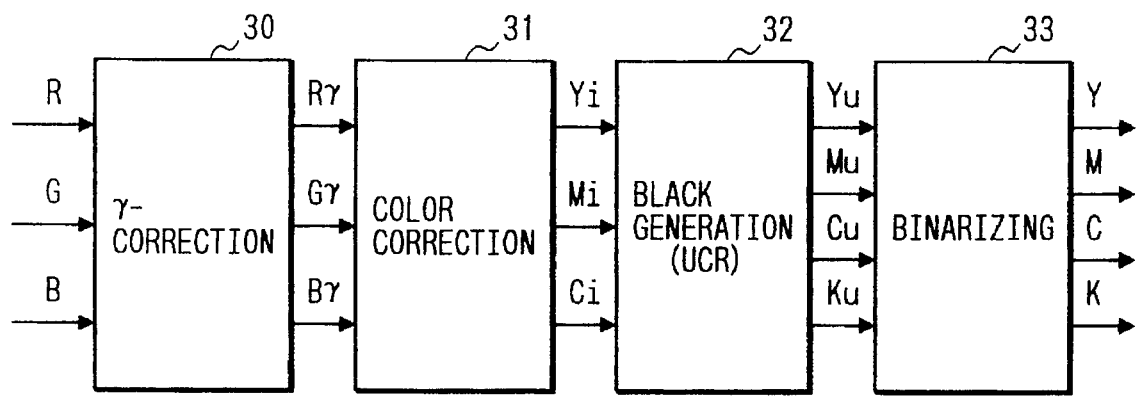
FIG. 3 is a block diagram showing a flow of image signal processing in a YMCK extraction circuit.
Figure 4:
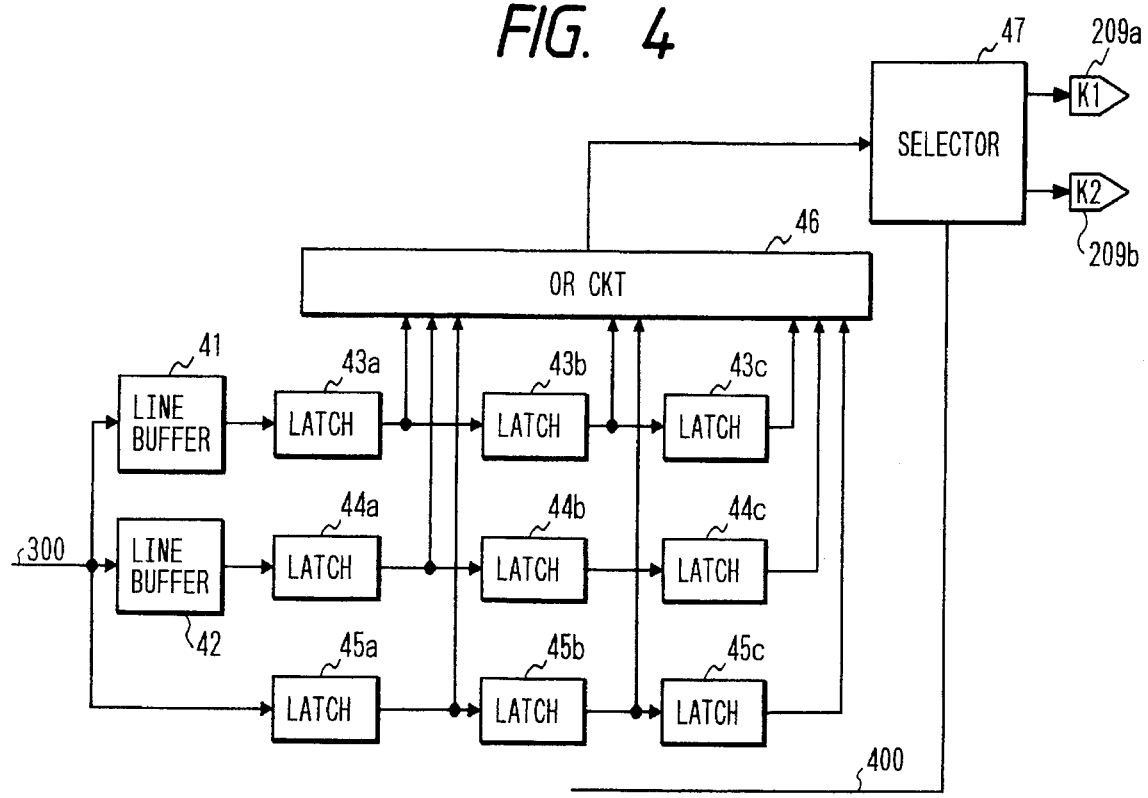
FIG. 4 is a block diagram showing general constitution of a dot judgment circuit.
Figure 5:
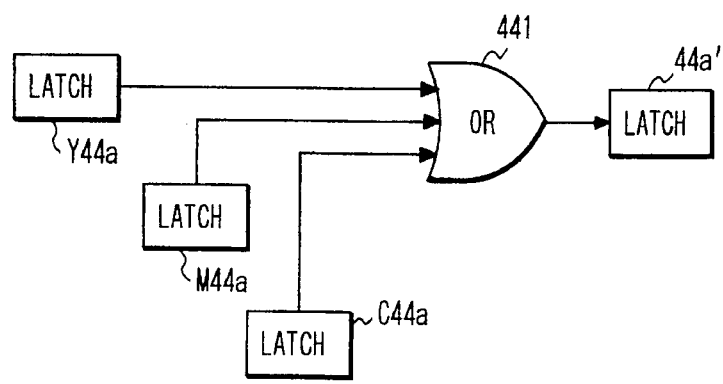
FIG. 5 is a diagram showing detailed constitution of a latch circuit.
Figure 6:
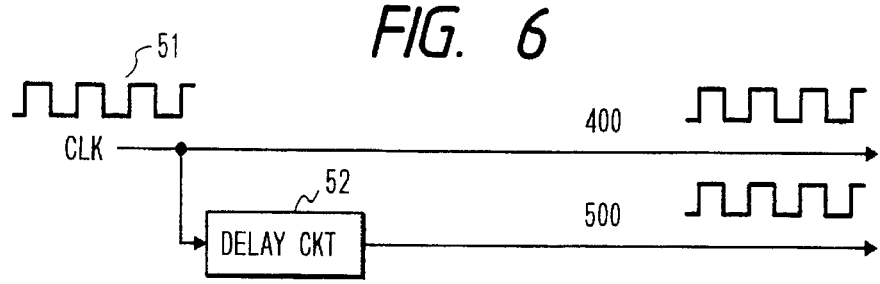
FIG. 6 shows constitution of a dot designation and sync circuit.

The operation of the above recording head drive circuit is described below. FIG. 3 is a block diagram showing a flow of image signal processing in the YMCK extraction circuit 213. FIG. 4 is a block diagram showing general constitution of the dot judgment circuit 208. FIG. 5 shows an example of detailed constitution of a latch circuit. FIG. 6 shows an example of constitution of the dot designation and sync circuit 206.

The three color separation image data of B, G and R are generated and processed in the image signal generating section 201, and stored into the respective frame memories 202–204. Then, the image data of R, G and B are sent from the frame memories 202–204 to the YMCK extraction circuit 213, where they are converted to the Y, M, C and K data.

As shown in FIG. 3, in the YMCK extraction circuit 213, first a gamma correcting section 30 converts the three color separation image data of R, G and B to $R_y$, $G_y$ and $B_y$ signals by performing logarithmic correction on the luminance signals. Then, a color correcting section 31 converts the $R_y$, $G_y$ and $B_y$ signals to image density signals in accordance with spectral characteristics of the inks, and further converts the image density signals to Yi, Mi and Ci signals, i.e., complementary color signals. Then, a black generating (UCR) section 32 generates a Ku (black) signal from the Yi, Mi and Ci signals, and further generates Yu, Mu ad Cu signals by removing Y, M and C components corresponding to the Ku signal, respectively. Finally, a binarizing section 33 binarizes the Yu, Mu, Cu and Ku signals by halftone processing using, for instance, the error spreading technique etc., to produce Y, M, C and K data. The binary Y, M, C and K data thus produced are stored into the memories 207a–207d for the respective colors (see FIG. 1).

Based on the Y, M, C and K data stored in the memories 207a–207d, the dot judgment circuit 208 judges whether there exists color information in several dots around the black dot (pixel) under attention, and determines whether the quick drying K ink or slow drying K ink should be used for the one-dot black data.

FIG. 4 shows an example of constitution of the dot judgment circuit 208, in which 8 dots directly adjacent to the dot under attention are used for the judgment. Using line buffers 41 and 42 that delay the data by one line, color data of a line one line prior to that of a line to which the judgment dot belongs are latched in latch circuits 43a–43c, color data of the line of the judgment dot are latched in latch circuits 44a–44c, and color data of a line one line subsequent to the line of the judgment dot are latched in latch circuits 45a–45c. That is, with the data of the pixel under attention latched in the latch circuit 44b, the color data of 3×3 dots including the pixel under attention as the center dot are latched in the latch circuits 43a–43c, 44a–44c and 45a–45c.

As shown in detail in FIG. 5, the latch circuit 44a, for instance, consists of a latch Y44a for one-dot Y data, a latch M44a for one-dot M data, a latch C44a for one-dot C data, a latch 44a' for judgment color data, and an OR circuit 441 for judging existence of color data. That is, in the latch circuit 44a, if at least one of the binarized Y data, M data and C data is on, the judgment color data of on is latched in the latch 44a'. If all of the Y data, M data and C data are off, the judgment color data of off is latched in the latch 44a'.

Upon the latching of the judgment color data, the judgment color data of the latch circuits 43a–43c, 44a, 44c and 45a–45c around the latch 44b corresponding to the black data under attention are input to an OR circuit 46, which judges whether there exists any color data around the black data. If at least one of the judgment color data of the latch circuits 43a–43c, 44a, 44c and 45a–45c is on, the resulting judgment signal becomes on, which indicates the existence of color data. Based on the judgment signal from the OR circuit 46, a selector 47 provides the binarized K data, which is output from the memory 207a, to the recording head 209b for the quick drying ink K2 if color data exists, and to the recording head 209a for the slow drying ink K1 if color data does not exist.

As shown in FIG. 6, based on a clock 51 sent from a CPU 205, the dot designation and sync circuit 206 generates a dot designation signal 400 and also generates, by a delay circuit 52, a printing timing signal 500 that has been delayed by a delay time of the dot judgment. The head drivers 214a–214e drive the respective recording heads 209a, 209b and 210–212 based on the printing timing signal 500.

The present invention is not limited to the above embodiment, but various modifications are possible. For example, instead of using the quick drying K ink, the quick drying inks of C, M and Y may be superposed on one another for printing in black portions.

Figure 7:
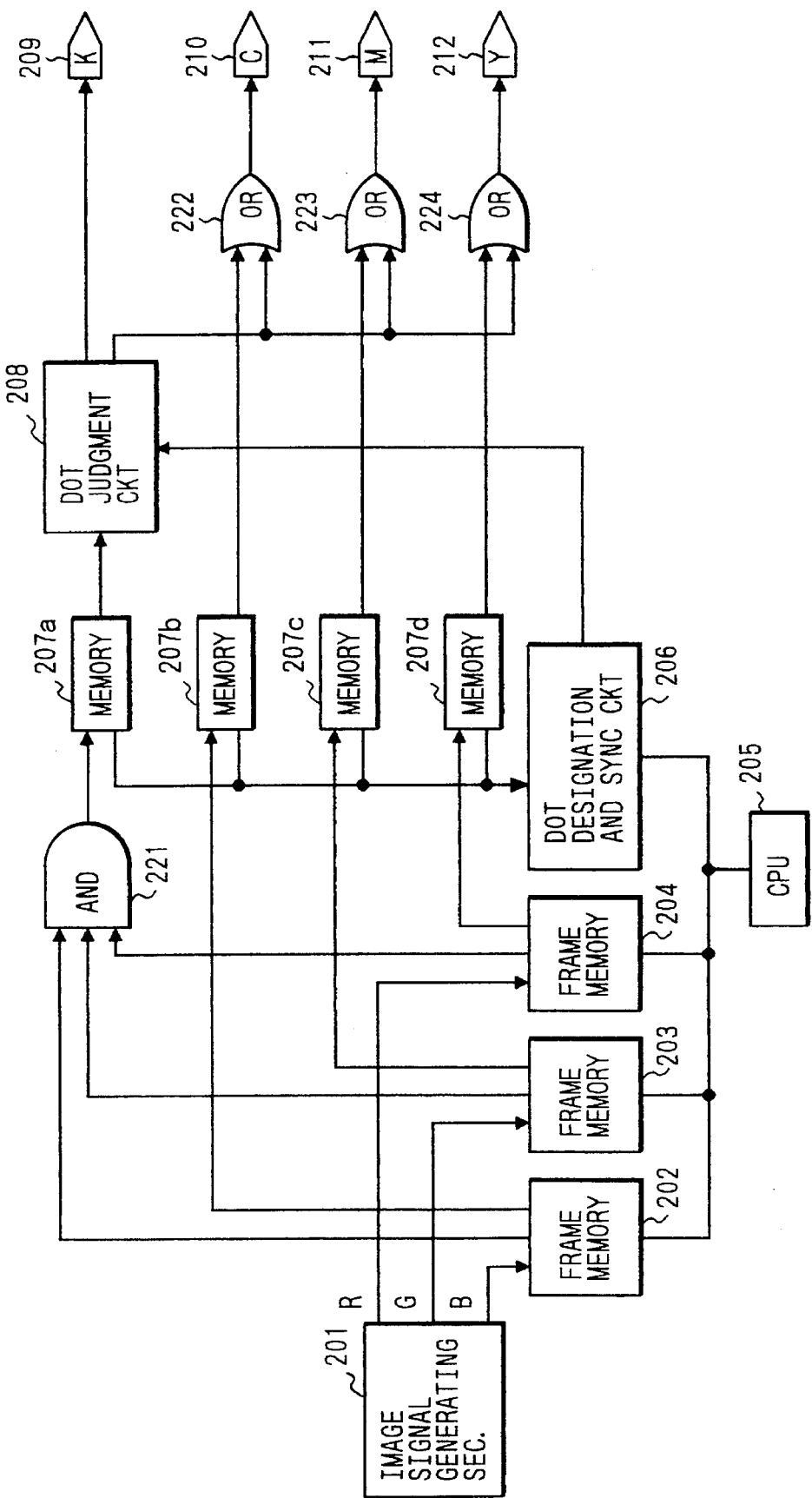
FIG. 7 is a block diagram showing a recording head drive circuit of a color ink jet recording apparatus according to another embodiment of the invention.

FIG. 7 shows a recording head drive circuit of this type of embodiment. A recording head 209 jets out drops of a slow drying K ink, and recording heads 210–212 jet out drops of quick drying inks of C, M and Y, respectively. The components 201–208 in FIG. 7 are similar to those in FIG. 1. That is, after the black data is extracted from the complementary color data, the binarized data K, C, M and Y are stored into the memories 207a–207d. The existence of color information in several dots around the black dot is judged by the dot designation and sync circuit 206 and the dot judgment circuit 208 to determine how to print the black data of one dot. Based on the judgment result, sent from the dot judgment circuit 208 to OR circuits 222–224, the black data of one dot associated with a dot having color information is printed by the recording heads 210–212 as a superposition of the quick drying inks of C, M and Y. The black data of one dot not associated with any dot having color information is printed with the slow drying K ink.

The 4-head color ink jet recording apparatus can be provided by this embodiment. While in the above embodiment the pixel under attention is excluded from the color data used in judging the existence of color information, the pixel under attention may be included therein. While in the above embodiment the 8 dots directly adjacent to the pixel under attention are used in judging the existence of color information, the area for the judgment may be expanded to be an area of 3×5 dots, 5×5 dots, 7×7 dots, etc.

According to the invention, even with the use of the smaller number of recording heads, the slow drying K ink capable of providing high-quality black images is used for image reproduction of a black area separated from color areas, the quick drying K ink that is free from ink running with respect to the quick drying inks of C, M and Y for color images is used for a black portion adjacent to a color area, and the quick drying color inks capable of providing high-quality color images are used for a color area. Therefore, the occurrence of ink running can be avoided in portions adjacent to a color area, and high-quality color images can be produced while the image quality is maintained in black portions.

What is claimed is:

1. A color ink jet recording apparatus comprising:
   first ink jetting means for jetting a slow drying black ink;
   second ink jetting means for jetting quick drying yellow, magenta and cyan inks;
   means for judging existence of color information in pixels adjacent to a black pixel, and for generating a judgment signal indicating a result of the judgment; means based on the judgment signal for selectively driving the first ink jetting means and the second ink jetting means, wherein the driving means drives the second ink jetting means to jet the quick drying yellow, magenta, and cyan inks for printing of the black pixel at times when the judgment signal indicates the existence of color information.

2. A color ink jet recording apparatus according to claim 1, wherein the judging means judges the existence of color information on a dot-pattern-developed image data.

3. A color ink jet recording apparatus according to claim 1:
   wherein the judging means judges the existence of the color information in pixels in a rectangular area having the black pixel under attention as a center of the rectangular area.

4. A color ink jet recording apparatus according claim 3, wherein the judging means is for judging the existence of color information in pixels directly adjacent to the black pixel.

5. A color ink jet recording apparatus comprising: first ink jetting means for jetting a slow drying black ink;
   second ink jetting means for jetting quick drying yellow, magenta, cyan and black inks;
   means for judging existence of color information in pixels adjacent to a black pixel, and for generating a judgment signal indicating a result of the judgment;
   means based on the judgment signal for selectively driving the first ink jetting means and the second ink jetting means, wherein the driving means drives the second ink jetting means to jet the quick drying black ink at times when the judgment signal indicates the existence of color information.

6. A color ink jet recording apparatus according to claim 5, wherein the judging means judges the existence of color information on a dot-pattern-developed image data.

7. A color ink jet recording apparatus according to claim 5 wherein the judging means judges the existence of the color information in pixels in a rectangular area having the black pixel under attention as a center of the rectangular area.

* * * * *

UNITED STATES PATENT AND TRADEMARK OFFICE
CERTIFICATE OF CORRECTION

PATENT NO. : 5,596,355
DATED : January 21, 1997
INVENTOR(S) : Toshio KOYAMA et al.

It is certified that error appears in the above-indentified patent and that said Letters Patent is hereby corrected as shown below:

Claim 3, column 6, line 2, "1:" should read --1 comprising:--.

Claim 4, column 6, line 8, after "according", insert --to--.

Signed and Sealed this

Twenty-sixth Day of August, 1997

Attest:

BRUCE LEHMAN

*Attesting Officer*    *Commissioner of Patents and Trademarks*